United States Patent Office 3,580,937
Patented May 25, 1971

3,580,937
7α- AND 7β-METHYL-3α,5α-CYCLOANDROSTANES, 6-METHYL DERIVATIVES THEREOF AND THE 19-NOR ANALOGUES OF THE FOREGOING
J. Allen Campbell and John C. Babcock, Kalamazoo, Mich., assignors to The Upjohn Company, Kalamazoo, Mich.
No Drawing. Filed July 29, 1969, Ser. No. 845,877
Int. Cl. C07c 169/20
U.S. Cl. 260—397.4    10 Claims

ABSTRACT OF THE DISCLOSURE

This invention relates to novel 7α- and 7β- methyl-3α,5α-cycloandrostanes and their 19-nor analogues embraced by the formula

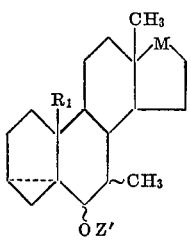

III wherein ∫ is a generic expression denoting α- and β- bonds and mixtures thereof; $R_1$ is selected from the group consisting of hydrogen and methyl; Z′ is selected from the group consisting of hydrogen, alkyl of from one through twelve carbon atoms and the acyl radical of a hydrocarbon carboxylic acid containing from one through twelve carbon atoms; M is selected from the group consisting of

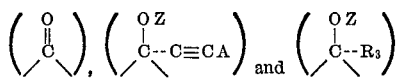

wherein A is selected from the group consisting of hydrogen, alkyl of from one through four carbon atoms, chlorine, bromine, and trifluoromethyl; $R_3$ is selected from the group consisting of hydrogen, alkyl of from one through twelve carbon atoms and alkenyl of from two through twelve carbon atoms; Z is selected from the group consisting of hydrogen and the acyl radical of a hydrocarbon carboxylic acid containing from one through twelve carbon atoms. These compounds (III) have anti-fertility, hypocholesteremic, anabolic, estrogenic, antihormonal and central nervous system depressing activities. They are consequently useful in treating mammals, including humans, and birds in those conditions where the foregoing properties make the new compounds valuable in medical and veterinary practice. These compounds are additionally useful as intermediates in the preparation of the corresponding rearranged 3-hydroxy and 3-acyloxy-Δ⁵-7-methyl steroids (e.g., those prepared and claimed in U.S. Pat. 3,380,886) wherein $R_1$ and M are the same as given above for the compounds of Formula III. The aforesaid Δ⁵-steroids are highly potent estrogen, anti-fertility and cholesterol-lowering agents.

BRIEF SUMMARY OF THE INVENTION

The novel compounds of this invention, intermediates therefor and process for their production are illustratively represented by the following sequence of formulae:

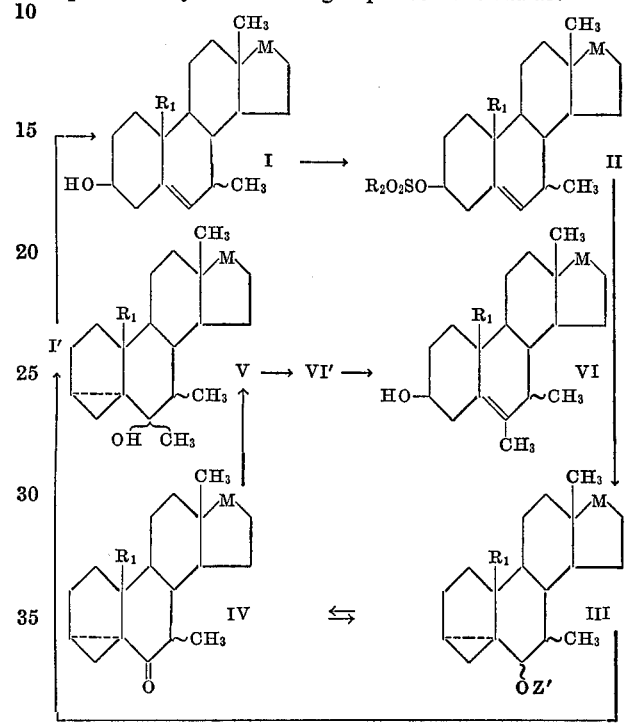

wherein ∫, $R_1$, Z′ and M have the same meaning as above, and $R_2$ is an organic radical selected from the group consisting of alkyl of from one through twelve carbon atoms and aryl of from six through twelve carbon atoms.

In this application the term "acyl" means the acyl radical of an organic carboxylic acid, preferably a hydrocarbon carboxylic acid of from one through twelve carbon atoms, for example, saturated and unsaturated aliphatic acids and aromatic acids, such as acetic, propionic, butyric, valeric, caproic, caprylic, decanoic, dodecanoic, triethylacetic, crotonic, cyclopentylformic, cyclohexylacetic, cyclopentylpropionic, benzoic, toluic, naphthoic, phenylacetic, cinnamic, succinic, dimethylglutaric acids, and the like. The term "alkyl" means an alkyl radical, preferably of from one through twelve carbon atoms, such as methyl, ethyl, propyl, butyl, pentyl, hexyl, heptyl, octyl, nonyl, decyl, undecyl, dodecyl and isomeric forms thereof. The term "alkenyl" means an alkenyl radical, preferably of from two through twelve carbon atoms, for example, ethenyl, propenyl, butenyl, pentenyl, hexenyl, heptenyl, octenyl, nonenyl, decenyl, undecenyl, and isomeric forms thereof. The term "alkynyl" means an alkynyl radical, preferably of from two through five carbon atoms, for example, ethynyl, propynyl, butynyl, pentynyl and isomeric forms thereof. The term "haloalkynyl" means a haloalkynyl radical preferably of from two through five carbon atoms; it differs from an alkynyl radical by having one or more of its hydrogen atoms substituted by halogen; typical haloalkynyl radicals are chloroethynyl, bromoethynyl, trifluoromethylethynyl, and the like. The term "aryl" means an aryl radical of from six through twelve carbon atoms, such as phenyl, tolyl, xylyl, naphthyl, alkylnaphthyl, diphenyl, and the like.

The novel compounds embraced by Formulae III through VI of the flow-sheet, above, are prepared from the known 7 ($\alpha$ and $\beta$)-methyl-3$\beta$-hydroxy-5-androstene starting materials of Formula I, which are synthesized in the manner described in U.S. Patent 3,380,886. Said patent describes the preparation of both the 7$\alpha$- and 7$\beta$-methyl isomers (in column 7) and a method for their separation (in Example 12). The aforesaid method can be used to separate the 7$\alpha$- and 7$\beta$-methyl isomers of the compounds produced in the present invention.

The first step of the novel process involves the 3-sulfonylation of a compound of Formula I, e.g., by its reaction in pyridine with an organic sulfonyl halide to yield a 3-aryl or 3-alkyl sulfonate of a 7-methyl-5-androsten-3$\beta$-ol (II). Excess sulfonyl halide is employed except M is

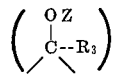

wherein $R_3$ and Z are hydrogen; in this instance, 1 to 1.2 equivalents of sulfonyl halide is used.

The next step of the process comprises subjecting a compound covered by Formula II to the i-steroid rearrangement (see: Fieser and Fieser, Steroids, pages 314 through 316, Reinhold Publishing Corp., New York, N.Y., 1959) to give a compound of Formula III. By this procedure a 3-aryl or alkyl sulfonate of a compound of Formula II on heating in an inert or reactive solvent or in an aqueous solvent such as aqueous acetone, aqueous dioxane and the like, or in an alcoholic solvent such as methanol, ethanol and the like, with an alkali metal acylate, e.g., potassium acetate, sodium benzoate, potassium phenylacetate, etc., yields a corresponding 7-methyl-6-oxygenated-3$\alpha$,5$\alpha$-cycloandrostane compound of Formula III. The compounds of Formula III wherein Z' is lower acyl, are prepared from the corresponding compounds of Formula II by direct displacement in a non-aqueous reaction mixture using a salt (such as the potassium salt) of acetic acid, or other lower carboxylic acid. An inert diluent can be used, if desired. The compounds of Formula III wherein Z' is lower alkyl are prepared by replacing the inert solvent with an alkanol having the desired alkyl group, for example, using methanol yields the 6-methyl ethers, ethanol gives the 6-ethyl ethers, etc. An inert diluent can be employed. The compounds of Formula III wherein Z is hydrogen are prepared by replacing the inert solvent with an aqueous solvent such as aqueous acetone, aqueous dioxane, aqueous tetrahydrofuran, aqueous t-butyl alcohol, and the like. The compounds of Formula III wherein Z' is hydrogen can be acylated by known methods, e.g., by treating them with the desired organic carboxylic acid anhydride (or halide) in the presence of an esterification catalyst, such as pyridine, at from about 0° to about 30° C. When M is a secondary alcohol, i.e., $R_2$ and Z therein are both hydrogen, Z will also be acylated.

In utilizing the first two steps of the process of this invention to prepare compounds of Formula III wherein Z and $R_3$ of M are hydrogen, compounds of Formula I wherein $R_3$ of M is hydrogen and Z therein is acyl can be used as starting materials and the resulting acyl compounds of Formula III saponified at pH 7.8 or higher. Also, compounds of Formula I wherein M is

after conversion to the corresponding compounds of Formulae II and III, can have the 17-keto function of the thus produced compounds (III) reduced, e.g., with sodium borohydride, to yield the products of Formula III wherein M is

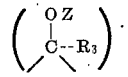

and $R_3$ and Z are hydrogen.

The 7-methyl-6-oxygenated-3$\alpha$,5$\alpha$-cycloandrostane compounds of Formula III wherein M is

can be converted to the corresponding 17$\alpha$-alkyl compounds (III) by the known methods described in (1) and (2), below.

(1) By treating the 17-ketone (III) with an alkyl lithium (e.g., methyl lithium, ethyl lithium, propyl lithium, butyl lithium, etc.) to yield the corresponding 7-methyl-17$\alpha$-alkyl-6-oxygenated - 3$\alpha$,5$\alpha$-cycloandrostane (III). The reaction is conducted advantageously in excess of the stoichiometric proportion, preferably in an amount of at least 1.5 moles of alkyl lithium per mole of starting 17-ketone (III).

(2) By treating the 17-ketone of Formula III with an appropriate Grignard reagent, i.e., an alkyl magnesium halide such as methylmagnesium bromide, ethylmagnesium chloride, propylmagnesium iodide, hexylmagnesium bromide, etc., in the presence of a solvent such as ether, tetrahydrofuran, benzene and the like, to produce the corresponding 7-methyl - 17$\alpha$ - alkyl-6-oxygenated-3$\alpha$,5$\alpha$-cycloandrostane (III). Preferably, the Grignard reagent is employed in an excess of the order of 3 to 10 moles per mole of starting 17-ketone (III).

The 7-methyl-6-oxygenated-3$\alpha$,5$\alpha$-cycloandrostane compounds of Formula III wherein M is

can be converted to the corresponding 17$\alpha$-alkynyl compounds (III) by the known methods described in (1) and (2), below.

(1) By treating the 17-ketone (III) with an alkali metal derivative such as lithium acetylide, sodium acetylide, potassium acetylide, lithium methylacetylide, sodium or potassium methylacetylide, sodium or potassium ethylacetylide, sodium or potassium propylacetylide, sodium butylacetylide, etc., in the presence of an inert solvent such as dioxane, dimethylformamide or dimethylsulfoxide, to yield the corresponding 7-methyl-17$\alpha$-alkynyl-6-oxygenated-3$\alpha$,5$\alpha$-cycloandrostane (III).

(2) By treating the 17-ketone of Formula III with an alkynylmagnesium halide (prepared by slowly passing a gas such as acetylene, methylacetylene, propylene, butylacetylene, etc., through an ethereal solution of an alkylmagnesium halide such as methylmagnesium bromide) in a solvent such as tetrahydrofuran, ether, benzene, etc., to yield a corresponding 7-methyl-17$\alpha$-alkynyl-6-oxygenated-3$\alpha$,5$\alpha$-cycloandrostane (III). Preferably, the Grignard reagent is employed in an excess of the order of 3 to 10 moles per mole of starting 17-ketone (III).

In the preparation of the 17$\alpha$-alkyl and 17$\alpha$-alkynyl compounds (III) from their 17-keto counterparts (III), when Z' is acyl this group is converted to hydrogen. The product can then be reacylated if desired.

The 7 - methyl-17$\alpha$-alkynyl-6-oxygenated-3$\alpha$,5$\alpha$-cycloandrostanes (III), prepared as in the preceding paragraphs designated (1) and (2), above, can be hydrogenated, e.g., in the presence of a suitable hydrogenation catalyst (such as palladium on charcoal) to obtain the corresponding 7-methyl-17$\alpha$-alkenyl (or alkyl)-6-oxygenated - 3$\alpha$,5$\alpha$ - cycloandrostanes (III). When the 17$\alpha$-alkynyl compounds (III) are reduced with a 1 molar equivalent of hydrogen the corresponding 17$\alpha$-alkenyl products (III) are obtained; using 2 molar equivalents yields the 17α-alkyl counterparts (III).

The novel 7-methyl-6-oxygenated - 3α,5α - cycloandrostanes of Formula III (embracing all of the meanings of M) can be readily rearranged to the corresponding Δ⁵-3β-hydroxy compounds of Formula I. For example, heating a compound of Formula III with zinc acetate in glacial acetic acid yields a corresponding Δ⁵-3-hydroxy 3-acetate (I′); hydrolysis of a thus produced 3-acetate (I′) with either acid or base (e.g., sodium carbonate in methanol and water, or hydrochloric acid in methanol or ethanol with or without water) yields its 3β-hydroxy counterpart (I). Where M is sensitive to acid, e.g., ethynylcarbinols, it is preferable to employ basic hydrolysis to effect saponification.

The novel 7-methyl - 6 - oxygenated -3α,5α-cycloandrostanes of Formula III (embracing all of the meanings of M except where both $R_3$ and Z are hydrogen) can be oxidized at the 6-position, e.g., by mixing them at low temperature with Jones reagent (8 N chromium trioxide in concentrated sulfuric acid diluted with water) to yield their 6-keto counterparts (IV).

The thus produced 6-keto compounds (IV), including all of the parameters of M except where it is

can be reduced at the 6-position, e.g., by reaction with sodium borohydride, lithium aluminum tri-tertiary butoxy hydride, lithium aluminum hydride and the like, at low temperatures or at room temperature to give the corresponding 6-hydroxyl compounds (III). However, when M of IV is

the 6,17β-dihydroxy counterpart (III) is produced. The stereoconfiguration of the 6-hydroxyl group in these compounds (III) is mainly α.

The 6-keto compounds of Formula IV, covering all of the meanings of M except where it is

can be converted to the corresponding 6-hydroxy-6-alkyl-7-methyl-3α,5α-cycloandrostane compounds (V), for example, by heating them in a solvent such as tetrahydrofuran or ether with a tetrahydrofuran or ether solution of an alkyl lithium or an alkylmagnesium halide (such as methylmagnesium bromide or ethylmagnesium iodide) to give the 6-hydroxy-7-methyl-3α,5α-cycloandrostanes of Formula V. When the product (V) wherein M is

is desired, the starting material (IV) wherein Z is hydrogen or acyl is used so as to prevent reactions at carbon-17, and the resulting corresponding 6-alkyl-7-methyl-6,17β-dioxygenated-3α,5α-cycloandrostane product (V) is oxidized (e.g., with Jones reagent) to yield the 6-hydroxy-6-alkyl-7-methyl-3α,5α-cycloandrostane-17-keto counterpart (V). When the 7-methyl group of IV is β, both the 6α-alkyl-6β-ol (V) and the epimeric 6β-alkyl-6α-ol (V) are obtained. When the 7-methyl group of IV is α, relatively more of 6β-alkyl-6α-ol is produced. Separation of the isomers is accomplished by chromatography and other procedures well known in the art.

The novel 7-methyl - 6 - oxygenated-3α,5α-cycloandroandrostanes of Formula V (embracing all of the meanings of M) can be rearranged to the corresponding Δ⁵-3β-hydroxy compounds of Formula VI, e.g., by following the procedures for the rearrangement of the compounds of Formula III→Formula I′→Formula I, indicated in the flow sheet, above, and described in Example 11, below, but substituting the starting materials of Formula V for those of Formula III, i.e., via the process represented by V→VI′→VI in the aforesaid flow-sheet and described in Example 16, below.

All of the compounds embraced by Formulae II through VI can be isolated from their respective reaction mixtures by conventional means, for example, when a water-miscible solvent is used, by pouring the reaction mixture into water and separating the resultant precipitate by filtration or by extraction with water-immiscible solvents. Additional purification of the product can be accomplished by conventional methods, for example, by single solvent elution chromatography from an adsorbent column with suitable solvent, such as acetone, ethyl acetate, Skellysolve B (hexanes), methylene chloride and mixtures thereof; also by gradient elution chromatography from an adsorbent column with a suitable mixture of solvents, such as, methylene chloride-Skellysolve B (hexanes), acetone-Skellysolve B, and the like.

The compounds of Formulae II through VI have antifertility, hypochloesteremic, anabolic estrogenic, anti-hormonal and central nervous system depressing activities. These properties make them useful in treating mammals, including humans, and birds in those conditions where the foregoing properties make them valuable in medical and veterinary practice.

The compounds represented by Formulae II through VI of the flow-sheet shown above can be prepared and administered to mammals, birds and animals in a wide variety of oral and parenteral dosage forms, singly or in admixture with other coacting compounds. They can be administered with a pharmaceutical carrier which can be a solid material or liquid, in which the compound is dissolved, dispersed or suspended. The solid composition can take the form of tablets, powders, capsules or the like, preferably in unit dosage forms for simple administration of precise dosages. The liquid compositions can take the form of solutions, emulsions, suspensions, syrups or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

EXAMPLE 1

7α-methyl-3β-hydroxy-5-androsten-17-one 3-p-toluenesulfonate (II)

A solution of 0.1 g. of 7α-methyl-3β-hydroxy-5-androsten-17-one (I) (prepared as in U.S. Patent 3,380,886) and 0.1 g. of p-toluenesulfonyl chloride in 1 ml. of pyridine was kept at room temperature for about 48 hours. An additional 50 mg. of p-toluenesulfonyl chloride was added to the reaction mixture and after about 4 hours water was added to precipitate the product. The product was collected, washed with water, dried and recrystallized from a mixture of acetone and Skellysolve B (hexanes) to yield 0.11 g. of 7α-methyl-3β-hydroxy-5-androsten-17-one 3-p-toluenesulfonate (II), having a melting point of 165 to 171° C., and an infrared spectrum having absorption bands at 1740, 1600, 1325, 1170, 920, 865 and 690 cm.⁻¹.

Following the procedure of Example 1, but employing an organic sulfonyl halide other than p-toluenesulfonyl chloride, e.g., methanesulfonyl chloride, benzenesulfonyl chloride, naphthylsulfonyl bromide, etc., yields respectively, the 3-methanesulfonate, 3-benzenesulfonate, 3-naphthylsulfonate, etc., of 7α-methyl-3β-hydroxy-5-androsten-17-one (II).

Following the procedure of the immediately preceding paragraph and Example 1, but substituting representative starting materials (I) prepared in U.S. Patent 3,380,886 and organic sulfonyl halides, such as (1) 7α-methl-5-androstene-3β,17β-diol 17-acetate (I) and propanesulfonyl bromide,
(2) 7α-methyl-17α-ethynyl-5-androstene-3β,17β-diol (I) and methanesulfonyl chloride,
(3) 7α-methyl-19-nor-17α(1-propynyl)-5-androstene-3β,17β-diol (I) and benzenesulfonyl chloride,
(4) 7α-methyl-19-nor-17α-trifluoromethylethynyl-5-androstene-3β,17β-diol 17-propionate (I) and naphthylsulfonyl bromide,
(5) 7α-methyl-17α-chloroethynyl-5-androstene-3β,17β-diol 17-butyrate (I) and methanesulfonyl chloride,
(6) 7α-methyl-19-nor-17α-(3,3,3-trifluoropropyl)-5-androstene-3β,17β-diol (I) and methanesulfonyl bromide,
(7) 7α-methyl-17α-bromoethynyl-5-androstene-3β,17β-diol 17-cyclopentylpropionate (I) and benzenesulfonyl bromide,
(8) 7α,17α-dimethyl-5-androstene-3β,17β-diol (I) and p-toluenesulfonyl chloride,
(9) 7α,17α-dimethyl-19-nor-5-androstene-3β,17β-diol (I) and methanesulfonyl chloride,
(10) 7α,17α-dimethyl-19-nor-5-androstene-3β,17β-diol 17-acetate (I) and p-toluenesulfonyl bromide,
(11) 7α-methyl-19-nor-5-androstene-3β,17β-diol 17-acetate (I) and propanesulfonyl chloride,
(12) 7α-methyl-19-nor-17α-ethynyl-5-androstene-3β,17β-diol (I) and methanesulfonyl bromide, etc., yields respectively, (1) 7α-methyl-5-androstene-3β,17β-diol 17-acetate 3-propanesulfonate (II),
(2) 7α-methyl-17α-ethynyl-5-androstene-3β,17β-diol 3-methanesulfonate (II),
(3) 7α-methyl-19-nor-17α(1-propynyl)-5-androstene-3β,17β-diol 3-benzenesulfonate (II),
(4) 7α-methyl-19-nor-17α-trifluoromethyl-ethynyl-5-androstene-3β,17β-diol 17-propionate 3-naphthylsulfonate (II),
(5) 7α-methyl-17α-chloroethynyl-5-androstene-3β,17β-diol 17-butyrate 3-methanesulfonate (II),
(6) 7α-methyl-19-nor-17α-(3,3,3-trifluoropropyl)-5-androstene-3β,17β-diol 3-methanesulfonate (II),
(7) 7α-methyl-17α-bromoethynyl-5-androstene-3β,17β-diol 17-cyclopentylpropionate 3-benzenesulfonate (II),
(8) 7α,17α-dimethyl-5-androstene-3β,17β-diol 3-p-toluenesulfonate (II),
(9) 7α,17α-dimethyl-19-nor-5-androstene-3β,17β-diol 3-methanesulfonate (II),
(10) 7α,17α-dimethyl-19-nor-5-androstene-3β,17β-diol 17-acetate 3-p-toluenesulfonate (II),
(11) 7α-methyl-19-nor-5-androstene-3β,17β-diol 3-propanesulfonate (II),
(12) 7α-methyl-19-nor-17α-ethynyl-5-androstene-3β,17β-diol 3-methanesulfonate (II), etc.

Following the procedure of Example 1 but substituting 7α-methyl-5-androstene-3β,17β-diol (I) or its 19-nor-counterpart (I) as starting material and employing in relation to steroid between about 1 to 1.2 equivalents of p-toluenesulfonyl chloride or methanesulfonyl chloride instead of an excess of these or other organic sulfonyl halides, yields a 3-alkyl or aryl sulfonate of 7α-methyl-5-androstene-3β,17β-diol (I) or the corresponding 19-nor compound (I).

EXAMPLE 2

*6β-hydroxy-7α-methyl-3α,5α-cycloandrostan-17-one (III)*

A solution of 0.3 g. of potassium acetate in 7 ml. of water and 7 ml. of acetone was purged with nitrogen and 0.11 g. of 7α-methyl-3β-hydroxy-5-androsten-17-one 3-p-toluenesulfonate (II) added. The mixture was heated at refluxing temperature for about 6 hours and the acetone evaporated with a fast stream of nitrogen. The product (III) crystallized with difficulty and was chromatographed through a silica gel (silicic acid) column and recrystallized from acetone-Skellysolve B (hexanes) to give 5.2 mg. of 7α-methyl-6β-hydroxy-3α,5α-cycloandrostan-17-one (III), having a melting point of 150 to 151° C.; its infrared absorption spectrum (determined from a mull of the compound) showed bands at 3800, 1740, 1380, 1040, 1025, 1030 and 920 cm.$^{-1}$; its nuclear magnetic resonance (NMR) spectrum (CDCl$_3$) showed: 0.1 to 0.6δ (m., 3, C$_3$-H and C$_4$-H$_2$), 0.9δ (d., 3, J=7 cps., C$_7$-CH$_3$), 0.91δ (s., 3, C$_{13}$-CH$_3$), 1.08δ (s., 3, C$_{13}$-CH$_3$), 1.08δ (s., 3, C$_{10}$-CH$_3$), 3.12δ (d., 1, C$_6$-H).

*Analysis.*—Calcd. for C$_{20}$H$_{30}$O$_2$ (percent): C, 79.42; H, 10.00. Found (percent): 7, 79.04; H, 10.03.

To 1 g. of the thus produced 6β-hydroxy-7α-methyl-3α,5α-cycloandrostan 17-one (III), 2 ml. of pyridine and 1 ml. of acetic anhydride is added. The reaction is kept at room temperature for about 3 hours; water is then added to precipitate the product and destroy the excess acetic anhydride. Recrystallization from acetone and Skellysolve B (hexanes) yields 6β-hydroxy 7α-methyl-3α,5α-cycloandrostan-17-one 6-acetate (III). Following the foregoing procedure but substituting for acetic anhydride (and allowing additional time for the slower reacting anhydrides), anhydrides and halides such as, benzoic acid anhydride, propionic anhydride, valeryl bromide, butyrl chloride, undecyl anhydride, dodecanoyl bromide, etc., yields, respectively, 7α-methyl-6β-hydroxy - 3α,5α - cycloandrostan-17-one 6-benzoate (III), 7α-methyl-6β-hydroxy-3α, 5α-cycloandrostan-17-one 6-propionate (III), 7α-methyl-6β-hydroxy-3α,5α-cycloandrostan-17-one 6-valerate (III), 6β-hydroxy-7α-methyl-3α,5α-cycloandrostan-17-one 6-butyrate (III), 6β-hydroxy-7α-methyl-3α,5α-cycloandrostan-17-one 6-undecanoate (III), 6β-hydroxy-7α-methyl-3α,5α-cycloandrostan-17-one 6-dodecanoate (III), etc.

Following the procedure of Example 2 but substituting for both the water and acetone the following:

(1) methanol,
(2) ethanol,
(3) isopropanol,
(4) sec. butanol,
(5) hexanol,
(6) octanol,
(7) decanol,
(8) dodecanol, etc., yields respectively, (1) 6β-methoxy-7α methyl-3α,5α-cycloandrostan-17-one (III),
(2) 6β-ethoxy-7α-methyl-3α,5α-cycloandrostan-17-one (III),
(3) 6β-isopropoxy-7α-methyl-3α,5α-cycloandrostan-17-one (III),
(4) 6β-sec. butoxy-7α-methyl-3α,5α-cycloandrostan-17-one (III),
(5) 6β-hexoxy-7α-methyl-3α,5α-cycloandrostan-17-one (III),
(6) 6β-octoxy-7α-methyl-3α,5α-cycloandrostan-17-one (III),
(7) 6β-decoxy-7α-methyl-3α,5α-cycloandrostan-17-one (III),
(8) 6β-dodecoxy-7α-methyl-3α,5α-cycloandrostan-17-one (III), etc.

Following the procedure of Example 2 but omitting water, and substituting for potassium acetate the following:

(1) potassium propionate,
(2) potassium isobutyrate,
(3) sodium valerate,
(4) potassium cyclopentylpropionate,
(5) sodium benzoate,
(6) potassium phenylacetate,
(7) potassium undecylate,
(8) potassium cinnamate, etc., yields respectively, (1) 6β-hydroxy-7α-methyl-3α,5α-cycloandrostan-17-one 6-propionate (III),
(2) 6β-hydroxy-7α-ethyl-3α,5α-cycloandrostan-17-one 6-isobutyrate (III),
(3) 6β-hydroxy-7α-methyl-3α,5α-cycloandrostan-17-one 6-valerate (III),
(4) 6β-hydroxy-7α- methyl-3α,5α-cycloandrostan-17-one 6-cyclopentylpropionate (III),
(5) 6β-hydroxy-7α-methyl-3α,5α-cycloandrostan-17-one 6-benzoate (III),
(6) 6β-hydroxy-7α-methyl-3α,5α-cycloandrostan-17-one 6-phenylacetate (III),
(7) 6β-hydroxy-7α-methyl-3α,5α-cycloandrostan-17-one 6-undecylate (III),
(8) 6β-hydroxy-7α-methyl-3α,5α-cycloandrostan-17-one 6-cinnamate (III), etc.

Following the procedure of Example 2 but substituting for 7α-methyl-3β-hydroxy-5-androstan-17-one (II) other compounds of Formula II, such as:

(1) 7α,17α-dimethyl-19-nor-5-androstene-3β,17β-diol 3-propanesulfonate (II),
(2) 7α,17α-dimethyl-5-androstene-3β,17β-diol 17-acetate 3-p-toluenesulfonate (II),
(3) 7α,17α-dimethyl-19-nor-5-androstene-3β,17β-diol 17-propionate 3-methanesulfonate (II),
(4) 7α-methyl-17α-propyl-5-androstene-3β,17β-diol 17-acetate 3-benzenesulfonate (II),
(5) 7α-methyl-17α-vinyl-5-androstene-3β,17β-diol 3-benzenesulfonate (II),
(6) 7α-methyl-17α-ethynyl-5-androstene-3β,17β-diol 3-naphthylsulfonate (II),
(7) 7α-methyl-19-nor-17α-chloroethynyl-5-androstene 3β,17β-diol 17-butyrate 3-methanesulfonate (II), etc., yields respectively, (1) 7α,17α-dimethyl-19-nor-3α,5α-cycloandrostane-6β,17β-diol (III),
(2) 7α,17α-dimethyl-3α,5α-cycloandrostane-6β,17β-diol 17-acetate (III),
(3) 7α,17α-dimethyl-19-nor-3α,5α-cycloandrostane-6β,17β-diol 17-propionate (III),
(4) 7α-methyl-17α-propyl-3α,5α-cycloandrostane-6β,17β-diol 17-acetate (III),
(5) 7α-methyl-17α-vinyl-3α,5α-cycloandrostane 6β,17β-diol (III),
(6) 7α-methyl-17α-ethynyl-3α,5α-cycloandrostane-6β,17β-diol (III),
(7) 7α-methyl-17α-chloroethynyl-19-nor-3α,5α-cycloandrostane-6β,17β-diol 17-butyrate (III), etc.

EXAMPLE 3

7α,17α-dimethyl-6β-methoxy-3α,5α-cycloandrostan-17β-ol (III)

A solution of 9.1 g. of 7α,17α-dimethyl-5-androstene-3β,17β-diol 3-p-toluenesulfonate (II), 0.3 g. of potassium acetate and 10 ml. of methanol is heated at refluxing temperature for about 6 hours then 10 ml. of water is added, the methanol evaporated under a stream of nitrogen. The reaction mixture is extracted with methylene chloride, then extracted with saturated aqueous sodium chloride solution, dried over sodium sulfate, and evaporated to dryness. The residue is purified by chromatography over silica gel to give 7α,17α-dimethyl-6β-methoxy-3α,5α-cycloandrostan-17β-ol (III).

Following the procedure of Example 3 but substituting for 7α,17α-dimethyl-5-androstene-3β,17β-diol 3-p-toluene-sulfonates (II) and methanol, other compounds of Formula II and other alkanols, such as:

(1) 7α-methyl-5-androsten-3β,17β-diol 3-ethanesulfonate (II) and ethanol,
(2) 7α-methyl-19-nor-5-androstene-3β,17β-diol 17-acetate 3-benzenesulfonate (II) and propanol,
(3) 7α-methyl-17α-ethynyl-5-androstene-3β,17β-diol 3-naphthylsulfonate (II) and isobutanol,
(4) 7α-methyl-17α(1-propynyl)-19-nor-5-androstene-3β,17β-diol 3-methanesulfonate (II) and octanol, etc., yields respectively, (1) 7α-methyl-6β-ethoxy-3α,5α-cycloandrostan-17β-ol (III),
(2) 7α-methyl-6β-propoxy-19-nor-3,5α-cycloandrostan-17β-ol 17-acetate (III),
(3) 7α-methyl-17α-ethynyl-6β-isobutoxy-3α,5-cycloandrostan-17β-ol (III),
(4) 7-methyl-17α(1-propynyl)-6β-octoxy-19-nor-3α,5α-cycloandrostan-17β-ol (III), etc.

EXAMPLE 4

7α-methyl-3α,5α-cycloandrostane-6β,17β-diol 6,17 diacetate (III)

To a solution of 1 g. of 7α - methyl-3α-5α-cycloandrostane-6β,17β-diol (III) (prepared as in Example 6) in 10 ml. of methylene chloride and 1 ml. of pyridine, 1 ml. of acetyl chloride is added. After standing for about 1 to 2 hours at room temperature, the solution is washed successively with water, dilute hydrochloric acid, dilute sodium bicarbonate, and water, then dried over sodium sulfate and the solvent evaporated. The residue is chromatographed through Florisil (synthetic magnesium silicate) and crystallized from acetone-Skellysolve B to give 7α - methyl - 3α,5α - cycloandrostane - 6β,17β - diol 6,17-diacetate (III).

Following the procedure of Example 4, but substituting 7α - methyl - 19 - nor - 3α,5α - cycloandrostane - 6β,17β-diol (III) as starting materials, yields 7α - methyl - 19-nor - 3α,5α - cycloandrostane - 6β,17β - diol 6,17 - diacetate (III).

In the same manner as in Example 4, the 6,17-dicyclopentyl-propionate, formate, butyrate, isobutyrate, valerate, isovalerate, hexanoate, octanoate, phenylacetate and other like 6,17 - diesters of 7α - methyl-3α,5α-cycloandrostane-6β,17β - diol (III) and their 19-nor counterparts are prepared by reaction of the corresponding 6β,17β-diols with the appropritae halide or acid anhydride of a hydrocarbon carboxylic acid.

Following the procedure of Example 4 but substituting for 7α - methyl - 3α,5α - cycloandrostane - 6β,17β-diol (III) and acetyl chloride, other compounds of Formula III and appropriate halides or acid anhydrides of hydrocarbon carboxylic acids such as:

(1) 7α,17α-dimethyl-3α,5α-cycloandrostane-6β,17β-diol (III) and propionyl chloride,
(2) 7α-methyl-19-nor-17α-ethynyl-3α,5α-cycloandrostane-6β,17β-diol (III) and butyric anhydride,
(3) 7α-methyl-17α-(2-butynyl)-3α,5α-cycloandrostane-6β,17β-diol (III) and isovaleric anhydride,
(4) 7α,17α-dimethyl-19-nor-3α,5α-cycloandrostane-6β,17β-diol 17-acetate and cyclopentylpropionyl chloride, etc., yields, respectively, (1) 7α,17α-dimethyl-3α,5α-cycloandrostane-6β,17β-diol 6-propionate (III),
(2) 7α-methyl-19-nor-17α-ethynyl-3α,5α-cycloandrostane-6β,17β-diol 6-butyrate (III),
(3) 7α-methyl-17α(2-butynyl)-3α,5α-cycloandrostane-6β,17β,diol 6-isovalerate (III),
(4) 7α,17α-dimethyl-19-nor-3α,5α-cycloandrostane-6β,17β-diol 6-cyclopentylpropionate 17-acetate (III), etc.

EXAMPLE 5

*7α-methyl-3α,5α-cycloandrostan-17α-ethynyl-6β,17β-diol 6,17-diacetate (III)*

A mixture of 1 g. of 7α - methyl - 17α - ethynyl - 3α,5α-cycloandrostane-6β,17β-diol (III) (prepared as in Example 7) in 20 ml. of acetic anhydride and 1 ml. of pyridine is stirred and heated at about 140° C. for about 1 hour under a nitrogen atmosphere. The reaction mixture is then cooled to room temperature and stirred with 100 ml. of water for about 2 hours. The product that separates is isolated by extraction, washed, evaporated to dryness, dissolved in methylene chloride, chromatographed on a column of Florisil, eluted with Skellysolve B (hexanes)-acetone, the eluate evaporated to dryness and recrystallized from aqueous methanol to give pure 7α-methyl-17α-ethynyl - 3α,5α - cycloandrostane - 6β,17β - diol 6,17-diacetate (III).

Following the procedure of Example 5 but substituting another starting material of Formula III and an appropriate acid anhydride of a hydrocarbon carboxylic acid, such as:

(1) 7α-17α-dimethyl-3α,5α-cycloandrostane-6β,17β-diol (III) and propionic anhydride, (2) 7α-methyl-17α-ethynyl-3α,5α-cycloandrostane-6β,17β-diol 6-acetate (III) and butyric anhydride, (3) 7α-methyl-17α(1-butynyl)-19-nor-3α,5α-cycloandrostane-6β,17β-diol (III) and isovaleric anhydride, etc., yields respectively, (1) 7α,17α-dimethyl-3α-5α-cycloandrostane-6β,17β-diol 6,17-dipropionate (III), (2) 7α-methyl-17α-ethynyl-3α,5α-cycloandrostane-6β,17β-diol 6-acetate 17-butyrate (III).

(3) 7-methyl-17α(1-butynyl)-19-nor-3α,5α-cycloandrostane-6β,17β-diol 6,17-diisovalerate (III).

EXAMPLE 6

*7α-methyl-3α,5α-cycloandrostane-6β,17β-diol (III)*

To a solution of 100 mg. of 7α-methyl-3α-cycloandrostane-6β-hydroxy-17-one (III) in 5 ml. of methanol, 1 drop of water and 40 mg. of sodium borohydride is added. After about 15 minutes a small additional amount (20 mg.) of sodium borohydride is added. After several minutes excess sodium borohydride is destroyed by a few drops of acetic acid. Water is added and the solution neutralized with 2 N hydrochloric acid. The crystalline residue is collected, washed with water and recrystallized from aqueous methanol and dried to yield 7α-methyl-3α,5α-cycloandrostane-6β,17β-diol (III).

Following the procedure of Example 6 but substituting other starting materials (III), such as:

(1) 7α-methyl-6β-hydroxy-19-nor-3α,5α-cycloandrostan-17-one (III), (2) 7α-methyl-6β-ethoxy-3α,5α-cycloandrostan-17-one (III), (3) 7α-methyl-6β-hydroxy-3α,5α-cycloandrostan-17-one 6-valerate (III), (4) 7α-methyl-6β-hydroxy-3α,5α-cycloandrostan-17-one 6-dodecanoate (III), etc., yields, respectively, (1) 7α-methyl-19-nor-3α,5α-cycloandrostane-6β,17β-diol (III), (2) 7α-methyl-6β-ethoxy-3α,5α-cycloandrostan-17β-ol (III), (3) 7α-methyl-3α,5α-cycloandrostane-6β,17β-diol 6-valerate (III), (4) 7α-methyl-3α,5α-cycloandrostane-6β,17β-diol 6-dodecanoate (III), etc.

EXAMPLE 7

*7α-methyl-17α-ethynyl-3α,5α-cycloandrostane-6β,17β-diol (III)*

A suspension of sodium acetylide (20% in xylene) is centrifuged and the sludge slurried with 10 ml. of dimethyl sulfoxide. A mixture of 2 g. of 7α-methyl-6β-hydroxy-3α,5α-cycloandrostan-17-one (III) (prepared as in Example 2) in 10 ml. of dimethylsulfoxide is mixed with the sodium acetylide. After keeping the mixture at room temperature for about a half hour it is stored in the refrigerator for about 16 hours. Water is added to the mixture and the product extracted with water. The extracts are washed with dilute acid, sodium bicarbonate solution and water, and the solvent removed to give an oily residue. The residue is chromatographed first through a column of Florisil and then through Woelm neutral alumina; recrystallization of the crude product gives pure 7α-methyl-17α-ethynyl-3α,5α-cycloandrostane - 6β,17β - diol (III).

Following the procedure of Example 7 but substituting for 7α-methyl-6β-hydroxy - 3α,5α - cycloandrostan-17-one (III), other compounds of Formula III, such as:

(1) 7α-methyl-6β-hydroxy-19-nor-3α,5α-cycloandrostan-17-one 6-acetate (III), (2) 7α-methyl-6β-propoxy-3α,5α-cycloandrostan-17-one (III), etc., yields, respectively, (1) 7α-methyl-17α-ethynyl-19-nor-3α,5α-cycloandrostane-6β,17β-diol (III), (2) 7α-methyl-17α-ethynyl-6β-propoxy-3α,5α-cycloandrostan-17β-ol (III), etc.

Following the procedure of the immediately preceding paragraph and of Example 7 but substituting for sodium acetylide, other acetylides, such as (1) sodium methylacetylide,
(2) potassium ethylacetylide,
(3) sodium chloroacetylide,
(4) lithium acetylide,
(5) sodium trifluoromethylacetylide, etc., yields, respectively, compounds such as (1) 7α-methyl-17α(1-propynyl)-3α,5α-cycloandrostane-6β,17β-diol (III), (2) 7α-methyl-17α(1-butynyl)-3α,5α-cycloandrostane-6β,17β-diol (III), (3) 7α-methyl-17α-chloroethynyl-19-nor-3α,5α-cycloandrostane-6β,17β-diol (III), (4) 7α-methyl-17α-ethynyl-3α,5α-cycloandrostane-6β,17β-diol (III), (5) 7α-methyl-17α-trifluoromethylethynyl-19-nor-3α,5α-cycloandrostane-6β,17β-diol (III), etc.

The 6β,17β-dihydroxy-17α-alkynyl compounds of Formula III, prepared as above, can be converted to their corresponding 6,17-diacylates in accordance with the procedure of Example 5. When the corresponding 6-monoacylate compounds (III) are desired, they are prepared from the 6β,17β-dihydroxy-17α-alkynyl compounds (III) by employing milder reaction conditions, e.g., by reaction at room temperature with the appropriate hydrocarbon carboxylic acid anhydride or halide in the presence of an esterification catalyst such as pyridine, in the manner set forth in Example 4.

EXAMPLE 8

*(a) 7α-methy-17α-vinyl-3α,5α-cycloandrostane-6β,17β-diol (III)*

A catalyst comprising a suspension of 100 mg. of 1% palladium on charcoal catalyst in 30 ml. of dioxane (purified by passage through a column of neutral alumina) is reduced at atmospheric pressure with hydrogen. A solution of 0.4 g. of 7α-methyl-17α-ethynyl-3α,5α-cycloandrostane-6β,17β-diol (III) in 5 ml. of dioxane is injected into the reaction flask containing the catalyst through a rubber stopper. Hydrogenation is continued until 1 mole of hydrogen is consumed at atmospheric pressure. The catalyst is removed by filtration and the filtrate concentrated by a rotary evaporator. The oily residue is chromatographed through a column of 125 g. of Florisil. The eluted material is crystallized from aqueous methanol. Recrystallization from the same solvent gives 7α-methyl-17α-vinyl-3α,5α-cycloandrostane - 6β,17β - diol (III).

Following the procedure of Example 8 but substituting other 17α-alkynyl starting materials (III), such as (1) 7α-methyl-17α(1-propynyl)-3α,5α-cycloandrostane-6β,17β-diol (III),
(2) 7α-methyl-17α-3′,3′,3′-trifluoropropynyl-19-nor-3α,5α-cycloandrostane-6β,17β-diol 6-propionate (III),
(3) 7α-methyl-17α(1-butynyl)-3α,5α-cycloandrostane-6β,17β-diol 6,17-diisovalerate (III), etc., yields, respectiveliy, (1) 7α-methyl-17α(1-propenyl)-3α,5α-cycloandrostane-6β,17β-diol (III),
(2) 7α-methyl-17α-3′,3′,3′-trifluoropropenyl-19-nor-3α,5α-cycloandrostane-6β,17β-diol 6-propionate (III),
(3) 7α-methyl-17α(1-butenyl)-3α,5α-cycloandrostane-6β,17β-diol 6,17-diisovalerate (III), etc.

(b) *7α-methyl-17α-ethyl-3α,5α-cycloandrostane-6β,17b-diol (III)*

Following the procedure of Example 8(a), above, but permitting the hydrogenation described therein to proceed until 2 moles of hydrogen is consumed instead of 1 mole, yields 7α-methyl-17α-ethyl-3α,5α-cycloandrostane-6β,17β-diol (III).

Following the procedure of Example 8(b) but substituting other 17α-alkynyl starting materials (III), such as (1) 7α-methyl-17α-ethynyl-19-nor-3α,5α-cycloandrostane-6β,17β-diol (III),
(2) 7α-methyl-17α-trifluoromethylethynyl-3α,5α-cycloandrostane-6β,17β-diol (III),
(3) 7α-methyl-17α(1-propynyl) - 3α,5α - cycloandrostane-6β,17β-diol 6-cyclopentylpropionate (III), etc., yields, respectively, (1) 7α-methyl - 17α - ethyl-19-nor-3α,5α-cycloandrostane-6β,17β-diol (III),
(2) 7α-methyl-17α-3′,3′,3′-trifluoropropyl-3α,5α-cycloandrostane-6β,17β-diol (III),
(3) 7α-methyl-17α-propyl-3α,5α-cycloandrostane-6β,17β-diol 6-cyclopentylpropionate (III), etc.

EXAMPLE 9

*7α,17α-dimethyl-3α,5α-cycloandrostane-6β,17β-diol (III)*

To a dry flask filled with nitrogen and containing 300 mg. of 7α-methyl-6β-hydroxy-3α,5α-cycloandrostan-17-one 6-acetate (III), 10 ml. of a 1.4 N ether solution of methyl lithium is added. The reaction mixture is refluxed for about 1 hour and then the excess methyl lithium is destroyed by the dropwise addition of water. The solution is acidified with 2 N hydrochloric acid and 1 ml. of methanol added to loosen the precipitate. The product is collected, washed with water, dried, recrystallized twice from moist methylene chloride to give 7α,17α-dimethyl-3α,5α-cycloandrostane-6β,17β-diol (III).

Following the procedure of Example 9 but employing 7α-methyl-19-nor - 3α,5α - cycloandrostane-6β,17β-diol 6-propionate (III) as starting material yields 7α,17α-dimethyl-19-nor-3α,5α-cycloandrostane-6β-17β-diol (III).

Following the procedure of Example 9 but using 7α-methyl-6β-ethoxy-3α,5α-cycloandrostan-17-one (III) as starting material yields 7α,17α-dimethyl-6β-ethoxy-3α,5α-cycloandrostan-17β-ol (III).

Using the procedure of Example 9 but replacing methyl lithium by ethyl lithium, propyl lithium, butyl lithium, etc., yields, respectively, 7α-methyl-17α-ethyl-3α,5α-cycloandrostane-6β,17β-diol (III), 7α-methyl-17α-propyl-3α,5α-cycloandrostane - 6β,17β - diol (III), 7α-methyl-17α-butyl-3α,5α-cycloandrostane-6β,17β-diol (III), etc.

The thus produced 6β,17β-dihydroxy-17α-alkyl compounds (III) can be converted to their corresponding 6,17-diacylates in accordance with the procedure of Example 5. When the 6-monoacylate counterparts (III) are desired, they are prepared from the 6β,17β-dihydroxy-17α-alkyl compounds (III) by employing milder reaction conditions, e.g., by reaction at room temperature with the appropriate hydrocarbon carboxylic acid anhydride or halide in the presence of an esterification catalyst such as pyridine, as in Example 4.

EXAMPLE 10

*7α,17α-dimethyl-3α,5α-cycloandrostane-6β,17β-diol (III)*

A solution of 2.75 g. of 7α-methyl-3α,5α-cycloandrostane-6β-hydroxy-17-one 6-acetate (III) in 70 ml. of tetrahydrofuran is added over a short period with stirring under an atmosphere of nitrogen to 25 ml. of a 3 M solution of methylmagnesium bromide in diethyl ether. The resulting mixture is distilled until the vapor temperature reaches 55° C. and the residue is then heated under reflux for approximately 4 hours. The mixture so obtained is cooled and 25 ml. of an iced ammonium chloride solution, followed by 130 ml. of methanol and 25 ml. of 5% aqueous sodium hydroxide solution, is carefully added with stirring. The mixture is stirred at 40° C. under nitrogen for several hours and then concentrated under reduced pressure to about one third of its volume. The resulting mixture is diluted with water and extracted with ether. The ether extract is washed successively with water, dilute hydrochloric acid, dilute aqueous sodium bicarbonate and water, then dried over anhydrous sodium sulfate and filtered. The filtrate is evaporated to dryness and the residue dissolved in methylene chloride and chromatographed over 100 g. of Florisil. The column is eluted with Skellysolve B (hexanes) containing increasing proportions of acetone and those fractions of the eluate which (on infrared absorption analysis) show no C–17 carbonyl absorption are combined and evaporated to dryness. The residue is recrystallized from a mixture of acetone and Skellysolve B to yield 7α,17α-dimethyl-3α,5α-cycloandrostane-6β,17β-diol (III).

Substituting 7α-methyl-6β-hydroxy-19-nor-3α,5α-cycloandrostan-17-one 6-acetate (III) as starting material in Example 10 yields 7α,17α-dimethyl-19-nor-3α,5α-cycloandrostane-6β,17β-diol (III).

Using the procedure of Example 10 but replacing methylmagnesium bromide by propylmagnesium chloride, isopropylmagnesium iodide, butylmagnesium bromide, allylmagnesium bromide, 2-butenylmagnesium bromide, etc., there are obtained 7α-methyl-17α-propyl-3α,5α-cycloandrostane-6β,17β-diol (III),
7α-methyl-17α-isopropyl-3α,5α-cycloandrostane-6β,17β-diol (III),
7α-methyl-17α-butyl-3α,5α-cycloandrostane-6β,17β-diol (III),
7α-methyl-17α-allyl-3α,5α-cycloandrostane-6β,17β-diol (III),
7α-methyl-17α(2-butenyl)-3α,5α-cycloandrostane-6β,17β-diol (III), etc., respectively. With the more sterically hindered Grignard reagents, some reduction of the 17-ketone also occurs to give 7α-methyl-17β-hydroxy-17α-hydrogen compounds (III), and chromatography is required to obtain the purified 7α-methyl-17α-alkyl substituted -3α,5α-cycloandrostane-6β,17β-diols (III).

EXAMPLE 11

*7α-methyl-3β-hydroxy-5-androsten-17-one (I)*

A solution of 3 g. of 7α-methyl-6β-hydroxy-3α,5α-cycloandrostan-17-one (III) and 7.3 g. of zinc acetate dihydrate in 40 ml. of glacial acetic acid is heated at reflux for about 5 hours. The reaction mixture is poured into water and extracted with ether. The extracts are washed with water, then dilute aqueous sodium bicarbonate solution, dried with sodium sulfate and the solvent evaporated. Recrystallization of the residue gives 7α-methyl-3β-hydroxy-5-androsten-17-one 3-acetate (I'). A mixture of 1 g. of this material (I'), 1 g. of sodium carbonate, 100 ml. of methanol and 5 ml. of water is heated to reflux under nitrogen for about one hour, then 200 ml. of water added and the methanol evaporated under reduced pressure. The precipitated white solid is separated by filtration, washed with water, dried and recrystallized from a mixture of acetone and Skellysolve B to yield 7α-methyl-3β-hydroxy-5-androsten-17-one (I).

Following the procedure of Example 11 but substituting other starting materials (III) for 7α-methyl-6β-hydroxy-3α,5α-cycloandrostan-17-one (III), such as, (1) 7α-methyl-6β-hydroxy-19-nor-3α,5α-cycloandrostan-17-one 6-acetate (III),
(2) 7α,17α-dimethyl-3α,5α-cyclandrostane-6β,17β-diol (III),
(3) 7α-methyl-17β-heptyl-6β-butoxy-3α,5α-cycloandrostane-17β-ol (III),
(4) 7α-methyl-17α-ethynyl-19-nor-3α,5α-cycloandrostane-6β,17β-diol 6,17-dipropionate (III),
(5) 7α-methyl-17α(1-butynyl)-3α,5α-cycloandrostane-6β,17β-diol 17-phenylacetate (III),
(6) 7α-methyl-17α-vinyl-19-nor-3α,5α-cycloandrostane-6β,17β-diol 17-isovalerate (III),
(7) 7α-methyl-17α(1-propenyl)-3α,5α-cycloandrostane-6β,17β-diol (III), etc., yields, respectively, (1) 7α-methyl-3β-hydroxy-19-nor-5-androsten-17-one (I),
(2) 7α,17α-dimethyl-5-androstene-3β,17β-diol (I),
(3) 7α-methyl-17α-heptyl-5-androstene-3β,17β-diol (I),
(4) 7α-methyl-17α-ethynyl-19-nor-5-androstene-3β,17β-diol 17-propionate (I),
(5) 7α-methyl-17α(1-butynyl)-5-androstene-3β,17β-diol 17-phenylacetate (III),
(6) 7α-methyl-17α-vinyl-19-nor-3α,5α-cycloandrostane-6β,17β-diol 17 isovalerate (III),
(7) 7α-methyl-17α(1-propenyl)-3α,5α-cycloandrostane-6β,17β-diol (III), etc., yields, respectively, (1) 7α-methyl-3β-hydroxy-19-nor-5-androsten-17-one (I),
(2) 7α,17α-dimethyl-5-androstene-3β,17β-diol (I),
(3) 7α-methyl-17α-heptyl-5-androstene-3β,17β-diol (I),
(4) 7α-methyl-17α-ethynyl-19-nor-5-androstene-3β,17β-diol 17-propionate (I),
(5) 7α-methyl-17α(1-butynyl)-5-androstene-3β,17β-diol 17-phenylacetate (I),
(6) 7α-methyl-17α-vinyl-19-nor-5-androstene-3β,17β-diol 17-isovalerate (I),
(7) 7α-methyl-17α(1-propenyl)-5-androstene-3β,17β-diol (I), etc.

EXAMPLE 12

*7α-methyl-3α,5α-cycloandrostane-6,17-dione (IV)*

A solution of 12 mg. of 7α-methyl-6β-hydroxy-3α,5α-cycloandrostan-17-one (III) in 3 ml. of acetone is cooled in an ice bath and 2 drops of Jones reagent (8 N chromium trioxide in concentrated sulfuric acid diluted with water, prepared as in J. Org. Chem. 21, 1547) is added. After standing overnight the excess oxidant is destroyed by the addition of 2 drops of isopropyl alcohol. Water is added and the acetone evaporated under a stream of nitrogen. The precipitated product is collected, washed with water and dried to yield 10 mg. of 7α-methyl-3α,5α-cycloandrostane-6,17-dione (IV) having a melting point of 210 to 215° C. The infrared absorption spectrum of the compound shows C=O bands at 1375 and 1675 cm.$^{-1}$.

Following the procedure of Example 12 but substituting other starting materials of Formula III, such as (1) 7α-methyl-6β-hydroxy-19-nor-3α,5α-cycloandrostan-17-one 6-propionate (III),
(2) 7α,17α-dimethyl-3α,5α-cycloandrostane-6β,17β-diol (III),
(3) 7α-methyl-17α-butyl-3α,5β-cycloandrostane-6β-propoxy-17β-ol (III),
(4) 7α-methyl-17α-ethynyl-19-nor-3α,5α-cycloandrostane-6β,17β-diol 6,17-diacetate (III),
(5) 7α-methyl-17α-chloroethynyl-3α,5α-cycloandrostane-6β,17β-diol (III),
(6) 7α-methyl-17α(1-butynyl)-19-nor-3α,5α-cycloandrostane-6β,17β-diol 17-isovalerate (III),
(7) 7α-methyl-17α-vinyl-3α,5α-cycloandrostane-6β,17β-diol 17-phenylacetate (III),
(8) 7α-methyl-17α(1-propenyl)-19-nor-3α,5α-cycloandrostane-6β,17β-diol (III),
(9) 7α-methyl-3α,5α-cycloandrostane-6β,17β-diol 6,17-diacetate (III), etc., yields, respectively, (1) 7α-methyl-19-nor-3α,5α-cycloandrostane-6,17-dione (IV),
(2) 7α,17α-dimethyl-17β-hydroxy-3α,5α-cycloandrostan-6-one (IV),
(3) 7α-methyl-17α-butyl-17β-hydroxy-3α,5α-cycloandrostan-6-one (IV),
(4) 7α-methyl-17α-ethynyl-17β-hydroxy-19-nor-3α,5α-cycloandrostan-6-one 17-acetate (IV),
(5) 7α-methyl-17α-chloroethynyl-17β-hydroxy-3α,5α-cycloandrostan-6-one (IV),
(6) 7α-methyl-17α-(1-butynyl)-17β-hydroxy-19-nor-3α,5α-cycloandrostan-6-one 17-isovalerate (IV),
(7) 7α-methyl-17α-vinyl-17β-hydroxy-3α,5α-cycloandrostan-6-one 17-phenylacetate (IV),
(8) 7α-methyl-17α(1-propenyl)-17β-hydroxy-19-nor-3α,5α-cycloandrostan-6-one (IV),
(9) 7α-methyl-17β-hydroxy-3α,5α-cycloandrostan-6-one 17-acetate (IV), etc.

EXAMPLE 13

*7α-methyl-3α,5α-cycloandrostane-6α,17β-diol (III)*

To a mixture of 1 g. of 7α-methyl-3α,5α-cycloandrostane-6,17-dione (IV) and 40 ml. of methanol, 0.2 g. of sodium borohydride is added. The reaction goes to completion rapidly. Water is added, and the product (III) is extracted with ether. The ether extract is washed with dilute hydrochloric acid, water and dried. The solvent is removed under vacuum and the product (III) purified by recrystallization from acetone-Skellysolve B (hexanes) to yield 7α - methyl - 3α,5α - cycloandrostane-6α,17β-diol (III).

Following the procedure of Example 13 but substituting other compounds of Formula IV for 7α-methyl-3α,5α-cycloandrostane-6,17-dione (IV), such as (1) 7α-methyl-19-nor-3α,5α-cycloandrostane-6,17β-dione (IV),
(2) 7α,17α-dimethyl-17β-hydroxy-3α,5α-cycloandrostane-6-one (IV),
(3) 7α-methyl-17α-octyl-17β-hydroxy-19-nor-3α,5α-cycloandrostane-6-one 17-dodecanoate (IV),
(4) 7α-methyl-17α-(1-butynyl)-17β-hydroxy-3α,5α-cycloandrostane-6-one (IV),
(5) 7α-methyl-17α-(3',3',3'-trifluoropropyl)-17β-hydroxy-3α,5α-cycloandrostane-6-one (IV),
(6) 7α - methyl-17α-vinyl-17β-hydroxy-3α,5α-cycloandrostan-6-one (IV),
(7) 7α-methyl-17α(1-propenyl)-17β-hydroxy-19-nor-3α,5α-cycloandrostane-6-one (IV), etc., yields, respectively, (1) 7α-methyl-19-nor-3α,5α-cycloandrostane-6α,17β-diol (III),
(2) 7α,17α - dimethyl-3α,5α-cycloandrostane-6α,17β-diol (III),
(3) 7α-methyl-17α-octyl-19-nor-3,5α-cycloandrostane-6α, 17β-diol 17-dodecanoate (III),
(4) 7α-methyl-17α(1-butynyl)-3α,5α-cycloandrostane-6α, 17β-diol (III),
(5) 7α-methyl-17α-(3',3',3'-trifluoropropyl)-19-nor-3α,5α-cycloandrostane-6α,17β-diol (III),
(6) 7α - methyl-17α-vinyl-3α,5α-cycloandrostane-6α,17β-diol (III),
(7) 7α-methyl-17α(1-propenyl)-19-nor-3α,5α-cycloandrostane-6α,17β-diol (III), etc.

EXAMPLE 14

*6β,7α-dimethyl-3α,5α-cycloandrostane-6α,17β-diol (V)*

To a solution of 1 g. of 7α-methyl-17β-hydroxy-3α,5α-cycloandrostan-6-one (IV) in 50 ml. of tetrahydrofuran, 10 ml. of an ethereal solution of 3 M methylmagnesium bromide is added. After completion of the reaction, the mixture is poured into ammonium chloride solution and extracted with ether. The ether extracts are washed with water, dried over sodium sulfate, and the ether removed under vacuum. The residue is purified by chromatography and crystallization to give 6β,7α-dimethyl-3α,5α-cycloandrostane-6α,17β-diol (V), and a small amount of 6α,7α-dimethyl-3α,5α-cycloandrostane-6α,17β-diol (V).

Following the procedure of Example 14 but substituting another compound of Formula V, such as (1) 7α-methyl-17β-hydroxy-19-nor-3α,5α-cycloandrostan-6-one 17-heptanoate (IV),
(2) 7α,17α-dimethyl-17β-hydroxy-3α,5α-cycloandrostan-6-one (IV),
(3) 7α - methyl-17α-hexyl-17β-hydroxy-3α,5-cycloandrostan-6-one 17-cyclopentylpropionate (IV),
(4) 7α-methyl-17α-ethynyl-17β-hydroxy-19-nor-3α,5α-cycloandrostan-6-one (IV),
(5) 7α-methyl-17α(1-propynyl)-17β-hydroxy-3α,5α-cycloandrostan-6-one 17-acetate (IV),
(6) 7α - methyl - 17α-butenyl-17β-hydroxy-3α,5α-cycloandrostan-6-one (IV),
(7) 7α-methyl-17α-octenyl-17β-hydroxy-19-nor-3α,5α-cycloandrostan-6-one (IV), etc., yields, respectively, (1) 6β,7α-dimethyl-19-nor-3α,5α-cycloandrostane-6α,17β-diol (V),
(2) 6β,7α,17α - trimethyl - 3α,5α-cycloandrostane-6α,17β-diol (V),
(3) 6β,7α-dimethyl-17α-hexyl-3α,5α-cycloandrostane-6α, 17β-diol (V),
(4) 6β,7α-dimethyl-17α-ethynyl-19-nor-3α,5α-cycloandrostane-6α,17β-diol (V),
(5) 6β,7α - dimethyl-17α(1-propynyl)-3α,5α-cycloandrostane-6α,17β-diol (V),
(6) 6β,7α - dimethyl - 17α-butenyl-3α,5α-cycloandrostane-6α,17β-diol (V),
(7) 6β,7α-dimethyl-17α-octenyl-19-nor-3α,5α-cycloandrostane-6α,17β-diol(V) etc., together with small amounts of the corresponding 6α,7α-dimethyl compounds (V).

EXAMPLE 15

*6β,7α-dimethyl-6α-hydroxy-3α,5α-cycloandrostan-17-one (V)*

A solution of 0.1 g. of 6β,7α-dimethyl-3α,5α-cycloandrostane-6α,17β-diol (V) (prepared as in Example 14) in 25 ml. of acetone is cooled in as bath and 15 drops of Jones reagent added. After a few minutes the excess oxidant is destroyed by the addition of 15 drops of isopropyl alcohol. Water is added and the acetone evaporated under a stream of nitrogen. The precipitated product is collected, washed with water and dried to yield 6β,7α-dimethyl-6α-hydroxy-3α,5α-cycloandrostan-17-one (V).

Following the procedure of Example 15, but substituting for 6β,7α-dimethyl-3α,5α-cycloandrostane-6α,17β-diol (V) other starting compounds of Formula V such as 6β, 7α - dimethyl - 19-nor-3α,5α-cycloandrostane-6α,17β-diol (V), yields 6α,7α-dimethyl-6α-hydroxy-19-nor-3α,5α-cycloandrostan-17-one (V).

EXAMPLE 16

*6,7α-dimethyl-3β-hydroxy-5-androsten-17-one (VI)*

A solution of 3 g. of 6β, 7α-dimethyl-3α,5α-cycloandrostan-6α-ol-17-one (V) (prepared as in Example 15) and 7.5 g. of zinc acetate dihydrate in 50 ml. of glacial acetic acid is heated at reflux for about 5 hours. The reaction mixture is poured into water and extracted with ether. The extracts are washed with water, then dilute aqueous sodium bicarbonate solution, dried with sodium sulfate and the solvent evaporated. Recrystallization of the residue gives 6,7α-dimethyl-3β hydroxy-5-androsten-17-one 3-acetate. A mixture of 1 g. of the thus produced Δ⁵³-acetate compound (VI'), 1 g. of sodium carbonate, 100 ml. of methanol and 5 ml. of water is heated to reflux under nitrogen for about 1 hour, then 200 ml. of water is added and the methanol evaporated under reduced pressure. The precipitated white solid is separated by filtration, washed with water, dried and recrystallized from a mixture of acetone and Skellysolve B to yield 6,7α-dimethyl-3β hydroxy-5-androsten-17-one (VI).

Following the procedure of Example 16 but substituting other starting materials (V) for 6β,7α-dimethyl-6α-hydroxy-3α,5α-cycloandrostan-17-one (V), such as (1) 6β,7α-dimethyl-6α-hydroxy-19-nor-3α,5α-cycloandrostan-17-one (V),
(2) 6β,7α,17α-trimethyl-3α,5α-cycloandrostane-6α,17β-diol (V),
(3) 6β,7α-dimethyl-17α-amyl-6β-methoxy-3α,5α-cycloandrostan-17β-ol (V),
(4) 6β,7α-dimethyl-17α-ethynyl-19-nor-3α,5α-cycloandrostane-6α,17β-diol (V),
(5) 6β,7α-dimethyl-17α-chloroethynyl-3α,5α-cycloandrostane-6α,17β-diol 17-propionate (V),
(6) 6α,7α-dimethyl-17α-vinyl-19-nor-3α,5α-cycloandrostane-6α,17β-diol (V),
(7) 6α,7α-dimethyl-17α(1-propenyl)-3α,5α-cycloandrostane-6β,17β-diol 17-valerate (V), etc., yields, respectively, (1) 6,7α-dimethyl-19-nor-3β hydroxy-5-androsten-17-one (VI),
(2) 6,7α,17α-trimethyl-5-androstene-3β,17β-diol (VI),
(3) 6,7α-dimethyl-17α-amyl-5-androstene-3β,17β-diol (VI),
(4) 6,7α-dimethyl-17α-ethynyl-19-nor-5-androstene-3β,17β-diol (VI),
(5) 6,7α-dimethyl-17α-chloroethynyl-5-androstene-3β,17β-diol 17-propionate (VI),
(6) 6,7α-dimethyl-17α-vinyl-19-nor-5-androstene-3β,17β-diol (VI),
(7) 6,7α-dimethyl-17α(1-propenyl)-5-androstene-3β,17β-diol-17-valerate (VI), etc.

We claim:
1. A compound of the formula

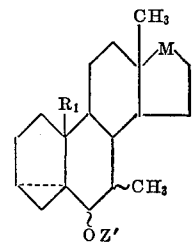

wherein ∫ is a generic expression denoting α- and β- bonds and mixtures thereof; $R_1$ is selected from the group consisting of hydrogen and methyl; Z' is selected from the group consisting of hydrogen, alkyl of from one through twelve carbon atoms, and the acyl radical of a hydrocarbon carboxylic acid containing from one through twelve carbon atoms; M is selected from the group consisting of

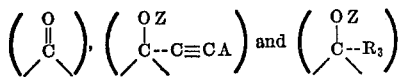

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

2. A compound of claim 1 wherein the bond at the 6-position has the β-stereoconfiguration, the bond at the 7-position has the α-stereoconfiguration, $R_1$ is methyl, Z' is hydrogen, and M is

namely, 6β - hydroxy - 7α - methyl-3α,5α-cycloandrostan-17-one of the formula

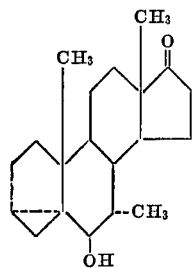

3. A compound of claim 1 wherein the bond at the 6-position has the β-stereoconfiguration, the bond at the 7-position has the α-stereoconfiguration, $R_1$ is methyl, Z' is hydrogen, and M is

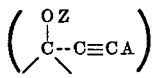

wherein A and Z are hydrogen, namely, 7α-methyl-17α-ethynyl-3α,5α-cycloandrostane-6β,17β-diol of the formula

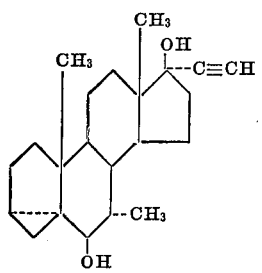

4. A compound of claim 1 wherein the bond at the 6-position has the β-stereoconfiguration, the bond at the 7-position has the α-stereoconfiguration, $R_1$ is methyl, Z' is hydrogen and M is

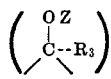

wherein $R_3$ and Z are hydrogen, namely, 7α-methyl-3α,5α-cycloandrostane-6β,17β-diol of the formula

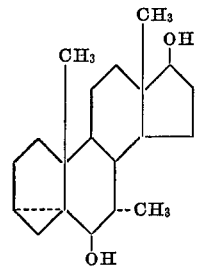

5. A compound of claim 1 wherein the bond at the 6-position has the β-stereoconfiguration, the bond at the 7-position has the α-stereoconfiguration, $R_1$ is methyl, Z' is hydrogen and M is

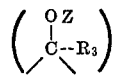

wherein $R_3$ is methyl, namely, 7α,17α - dimethyl - 3α,5α-cycloandrostane-6β,17β-diol of the formula

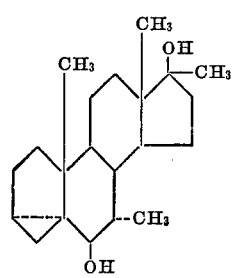

6. A compound of claim 1 wherein the bonds at the 6- and 7-positions have the α-stereoconfiguration, $R_1$ is methyl, Z' is hydrogen and M is

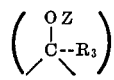

wherein $R_3$ and Z are hydrogen, namely, 7α-methyl-3α,5α-cycloandrostane-6α,17β-diol of the formula

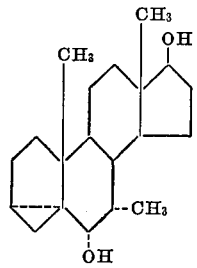

7. A compound of claim 1 wherein the bonds at the 6- and 7-positions have the α-stereoconfiguration, $R_1$ is hydrogen, Z' is hydrogen and M is

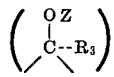

wherein $R_3$ and Z are hydrogen, namely, 7α-methyl-19-nor-3α,5α-cycloandrostane-6α,17β-diol of the formula

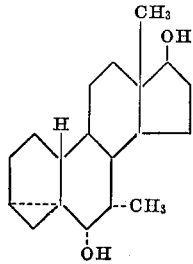

8. A compound of claim 1 wherein the bond at the 6-position has the α-stereoconfiguration, the bond at the 7-position has the β-stereoconfiguration, $R_1$ is methyl, $Z'$ is hydrogen and M is

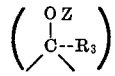

wherein $R_3$ and Z are hydrogen, namely, 7β-methyl-3α,5α-cycloandrostane-6α,17β-diol of the formula

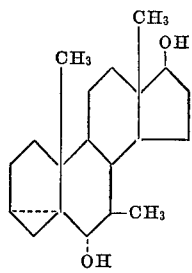

9. A compound of claim 1 wherein the bonds at the 6- and 7-positions have the β-stereoconfiguration, $R_1$ is methyl, $Z'$ is hydrogen, and M is

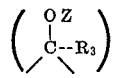

wherein $R_3$ is hydrogen and Z is acetyl, namely, 7β-methyl-3α,5α-cycloandrostane-6β,17β-diol 17-acetate of the formula

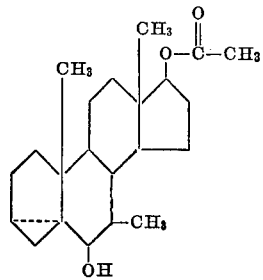

10. A compound of the formula

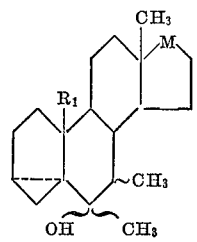

wherein } is a generic expression denoting α- and β-bonds and mixtures thereof; $R_1$ is selected from the group consisting of hydrogen and methyl; M is selected from the group consisting of

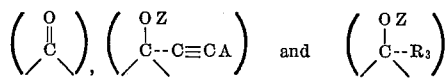

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

References Cited

Fieser et al.: Steroids, pp. 314–316, Reinhold Pub. Co., New York, N.Y. (1959).

HENRY A. FRENCH, Primary Examiner

U.S. Cl. X.R.

260—397.5, 999